Jan. 12, 1954   J. A. WHITE, JR   2,665,920
VERTICALLY ADJUSTABLE FRAME FOR IMPLEMENT SUPPORTING CARTS
Filed Oct. 10, 1949   2 Sheets-Sheet 1

INVENTOR
John A. White Jr.
BY
ATTORNEYS

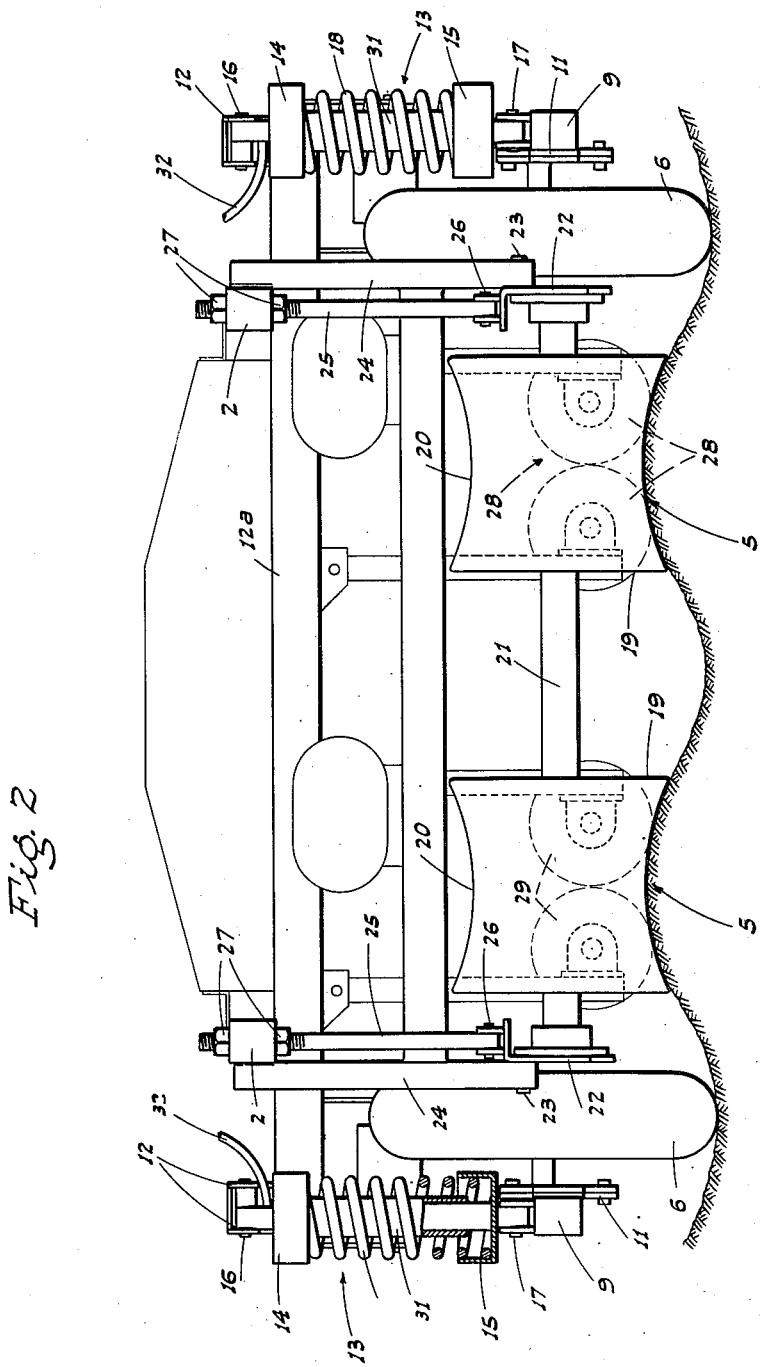

Patented Jan. 12, 1954

2,665,920

UNITED STATES PATENT OFFICE 2,665,920

VERTICALLY ADJUSTABLE FRAME FOR
IMPLEMENT SUPPORTING CARTS

John A. White, Jr., Gilroy, Calif., assignor to
Be-Ge Manufacturing Co., Gilroy, Calif., a
corporation of California Application October 10, 1949, Serial No. 120,445

2 Claims. (Cl. 280—44)

The present invention relates in general to agricultural equipment.

In particular the invention is directed to, and it is an object to provide, a trailer type cart, of novel construction and function, adapted to support an agricultural implement in a predetermined working position.

Another object of the present invention is to provide a cart which is adapted to support an agricultural implement for accurate tracking relation along a ridged crop row; the cart spanning one or more rows and the implement being mounted intermediate the sides of the cart so as to work along said rows as the cart advances.

A further object of the invention is to provide an implement supporting cart, as above, which is carried at opposite sides by wheels which run in the longitudinal furrows between the ridged crop rows; there being a novel roller assembly, in addition to the wheels, which runs on top of the ridged crop rows to stabilize the cart and implement, and to maintain the same at proper working level even though the wheels traverse depressions in the furrows.

An additional object of the invention is to provide an implement supporting cart, as in the preceding paragraph, wherein the roller assembly is vertically adjustable, so that the cart is adaptable for use along ridged crop rows of different heights; there being spring mounts between the cart frame and wheels so that the latter may run in the furrows in any position of adjustment of said roller assembly. Additionally, the loading of the spring mounts 13 can be regulated so that a varying proportion of the weight of the cart may be carried on the roller assembly; thereby controlling the pressure applied to the ridges of the engaged crop rows.

It is also an object of the invention to provide an implement supporting cart, as above, wherein the spring mounts for the wheels each have a fluid pressure actuated power cylinder arranged therewith in a manner such that the main frame of the cart, together with the roller assembly and supported implement, may be elevated, by extension of said cylinders, to a non-working position for turning at the end of a field, or for transport from place to place.

A further object of the invention is to provide a practical and reliable implement supporting cart, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged rear end view of said implement supporting cart.

Figure 1:
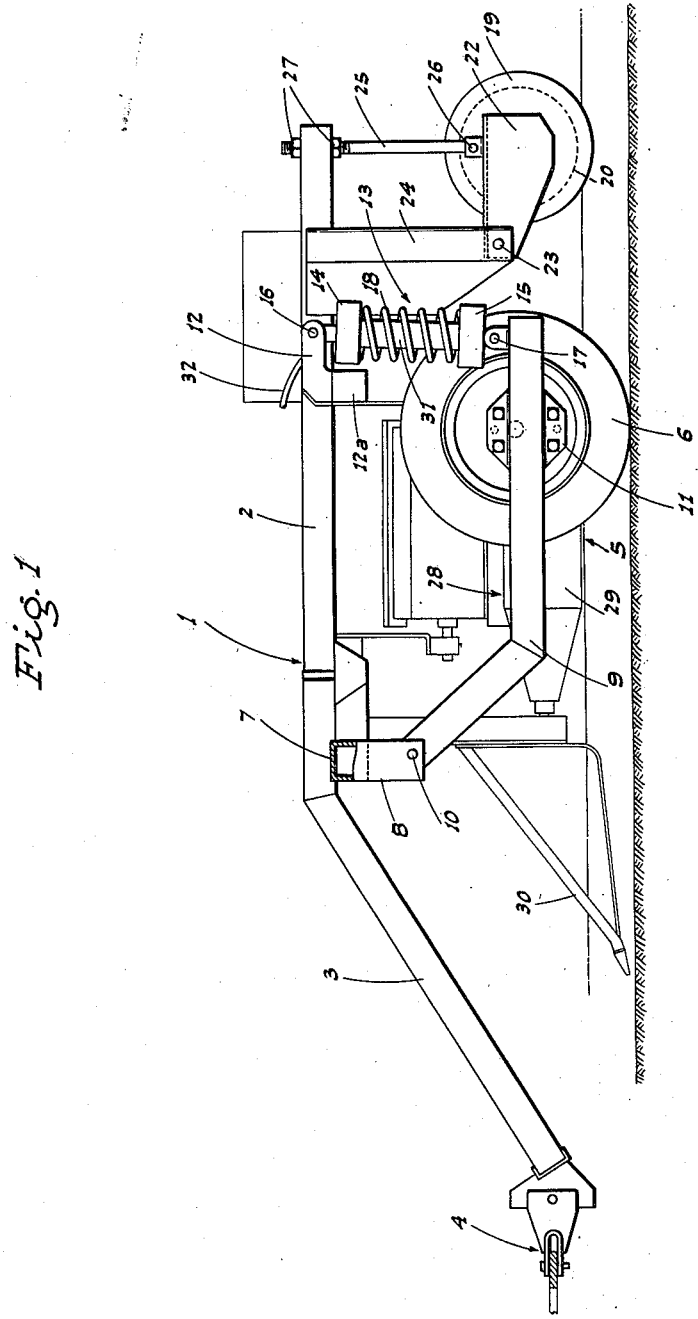
Fig. 1 is a side elevation of the implement supporting cart in working position.

Referring now more particularly to the characters of reference on the drawings, the novel implement supporting cart comprises a rigid, substantially horizontal main frame, indicated generally at 1, which includes longitudinal side beams 2. A rigid draft tongue 3 is secured to, and projects forwardly from, the front end of the main frame 1, and said draft tongue 3 is fitted, at the front, with a hitch 4 whereby the cart is coupled to a tractor.

The main frame 1 is adapted to travel above and along a plurality of ridged crop rows 5 in spanning relation thereto, and at opposite sides such frame is supported by pneumatic tire wheels 6 which track in the row furrows; such wheels being secured to the frame by means of draft beam and spring mount assemblies, each of which comprises:

Adjacent the front thereof the main frame 1 includes a front cross beam 7 which is fitted, at its ends, with depending brackets 8. A longitudinal draft beam 9 extends along each side of the frame, and includes an upturned forward end portion, which is pivoted, as at 10, to the corresponding bracket 8. The related wheel 6 is secured to each draft beam 9, adjacent but short of its rear end, by means of a vertically adjustable attachment unit 11.

At each side thereof, and in spaced relation directly above the rear end of the corresponding draft beam 9, the main frame 1 is fitted with a bracket 12, on the projecting end of a cross beam 12a, and a spring mount, indicated generally at 13, is connected between such points; each such spring mount being constructed as follows:

Spaced but facing cups or seats, indicated at 14 and 15, are pivotally secured, as at 16 and 17, to each bracket 12, and the rear end of the corresponding draft beam 9; there being a heavy-duty compression spring 18 extending between and engaging in said seats or cups 14 and 15. With this arrangement each wheel 6 is capable of independent floating motion as the cart advances and said wheels travel in the row furrows.

Some distance rearwardly of the axis of the wheels 6, the cart includes transversely spaced rollers 19, having concave faces 20, disposed to engage and track along the ridged crop rows 15.

The rollers 19 are mounted on a horizontal cross shaft 21, which is carried at its ends in longitudinal, vertically swingable mounting arms 22 which project forwardly from the shaft ends. At their front ends the mounting arms 22 are pivoted, as at 23, to the lower ends of standards 24 which are fixed on, and depend from, the main frame 1.

The longitudinal side beams 2 of the main frame 1 project rearwardly of the standards 24, and an adjustment rod 25 extends between the rear ends of each longitudinal side beam 2 and the corresponding mounting arm 22, being pivoted to the latter, as at 26. The upper end portion of each adjustment rod 25 projects through the adjacent side beam 2, and adjustment nuts 27 are threaded on said rod above and below said beam.

Ahead of the rollers 19, and between the wheels 6, the main frame 1 of the cart suspends implements adapted to work along corresponding crop rows 5, one such implement being here indicated generally at 28.

In the present embodiment, the implements 28 are designed for the removal of guayule plants from the crop rows, and each such implement includes a pair of cooperating plant uprooting rollers 29. Additionally, each implement includes plant or vine pick-up fingers 30 which project forwardly on the opposite sides of the ridged crop rows 5.

As will be obvious, the type of agricultural implement which is suspended from the main frame 1 of the cart forms no part of the present invention; the latter being directed to said cart and its structural characteristics.

When the cart is coupled to a tractor and is traveling in spanning relation along ridged crop rows 5, with the implements 28 in operation, it is essential that such implements be maintained in accurate position relative to the crown of said rows.

While the spring mounts 13 maintain the main frame 1 in a supported position, such frame, without the aid of the rollers 19, would be subject to some rise and fall when the wheels traverse depressions in the row furrows, and which would cause undesirable vertical motion of the implements 28. To prevent this from occurring, the rollers 19 are adjusted by the rods 25 so as to maintain the main frame 1 in a predetermined fixed horizontal plane with respect to the ridged crop rows 5. Consequently, undulation of the wheels 6 causes no corresponding response in the main frame 1 or implements 28.

Regulation of the loading of the spring mounts 13 is obtained by vertical adjustment of the wheels 6, through the medium of the attachment units 11, relative to the arms 9, which will determine the amount of compression of the springs 18 for any given ridge height, and the pressure applied to the ridges of the crop rows.

When it is desired to turn the cart at the end of a field, or for transport, the main frame 1 is swung upwardly, lifting the rollers 19 and implements 28 to an above-ground non-working position, and this is accomplished by the following mechanism:

Each spring mount 13 includes, within the confines of the spring 18, a fluid pressure actuated power cylinder 31 connected, at opposite ends, to the upper cup 14 and lower cup 15. The fluid pressure actuated power cylinders 31 are normally inactive, but are adapted to be energized through the medium of a valve controlled, fluid pressure conduit system, indicated in part at 32. When the power cylinders 31 are energized, they extend in effective length, pushing the main frame 1 upwardly to an elevated position, at which time the implements 28 and rollers 19 are in clearance relation above the ridged crop rows 5.

The described cart provides a very practical and effective vehicle for the proper support of agricultural implements adapted to work along ridged crop rows.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an implement supporting cart having a frame, and wheels on opposite sides of the frame; mounting means for each wheel comprising a longitudinal draft beam on which the wheel is journaled, a pivotal connection between one end of the beam and the frame, vertically spaced and alined spring seats on the other end of the beam and the frame above, a normally loaded helical compression spring extending between and engaging said seats, a hydraulic cylinder inside the spring connected to one seat and extending toward the other seat, a plunger slidably projecting into the cylinder from and connected to said other seat, the cylinder and plunger constituting a normally inactive ram and a fluid feed conduit connected to the cylinder beyond the plunger so that the ram may be extended sufficiently to unload the spring; the spring seats being in the form of relatively deep cups so that the ends of the spring will remain confined therein when the ram is extended and the spring is unloaded.

2. In an implement supporting cart having a frame, and wheels on opposite sides of the frame; mounting means for each wheel comprising a longitudinal draft beam on which the wheel is journaled, a transverse pivotal connection between one end of the beam and the frame, and a vertically yieldable connection unit between the other end of the beam and the frame above, said unit comprising vertically spaced and aligned spring seats, transverse pivotal connections between the seats and the beam and frame, the first named pivotal connections being in a horizontal plane substantially midway between the planes of the last named pivotal connections, a helical load-supporting compression spring extending between and engaging the spring seats, and a normally inactive, extensible ram within the spring and including a cylinder and a plunger, the cylinder at its outer end being secured rigid with one seat and the plunger at its outer end being secured rigid with the other seat.

JOHN A. WHITE, Jr.

References Cited in the file of this patent

UNITED STATES PATENTS

| Number | Name | Date |
|---|---|---|
| 117,257 | Cass | July 25, 1871 |
| 747,218 | Plants | Dec. 15, 1903 |
| 1,269,111 | Oliver | June 11, 1918 |
| 1,283,990 | Volz | Nov. 5, 1918 |
| 1,941,143 | Wickersham | Dec. 26, 1933 |
| 1,981,655 | Lucke | Nov. 20, 1934 |
| 2,059,205 | Buffington | Nov. 3, 1936 |
| 2,066,864 | Tucker | Jan. 5, 1937 |
| 2,182,249 | Chayne | Dec. 5, 1939 |
| 2,197,670 | Theis | Apr. 16, 1940 |
| 2,334,597 | Badertscher | Nov. 16, 1943 |
| 2,414,507 | Callahan | Jan. 21, 1947 |
| 2,495,449 | Francis | Jan. 24, 1950 |
| 2,540,100 | Coeur | Feb. 6, 1951 |
| 2,544,023 | Johnson | Mar. 6, 1951 |
| 2,544,024 | Johnson | Mar. 6, 1951 |
| 2,560,625 | Boggs et al. | July 17, 1951 |